(12) United States Patent
Matlik (10) Patent No.: US 12,023,743 B2
(45) Date of Patent: Jul. 2, 2024

(54) CLAMPING DEVICE FOR TOOL HOLDER

(71) Applicant: AB SANDVIK COROMANT, Sandviken (SE)

(72) Inventor: Gunnar Matlik, Sandviken (SE)

(73) Assignee: AB Sandvik Coromant, Sandviken (SE)

(*) Notice: Subject to any disclaimer, the term of this patent is extended or adjusted under 35 U.S.C. 154(b) by 417 days.

(21) Appl. No.: 17/618,001

(22) PCT Filed: Jun. 9, 2020

(86) PCT No.: PCT/EP2020/065939
§ 371 (c)(1),
(2) Date: Dec. 10, 2021

(87) PCT Pub. No.: WO2020/249551
PCT Pub. Date: Dec. 17, 2020

(65) Prior Publication Data
US 2022/0347764 A1    Nov. 3, 2022

(30) Foreign Application Priority Data

Jun. 11, 2019 (EP) ..................... 19179442

(51) Int. Cl.
*B23B 31/26* (2006.01)
(52) U.S. Cl.
CPC ...... *B23B 31/265* (2013.01); *B23B 2260/136* (2013.01); *B23B 2260/146* (2013.01)
(58) Field of Classification Search
CPC ............ B23B 31/265; B23B 2260/136; B23B 2260/146
See application file for complete search history.

(56) References Cited

U.S. PATENT DOCUMENTS 5,911,547 A * 6/1999 Klement ............... B23B 31/261
279/134
6,619,896 B1 * 9/2003 Spors .................. B23B 31/1077
29/DIG. 56

FOREIGN PATENT DOCUMENTS

| EP | 0780180 A1 | 6/1997 |
| EP | 1468767 A1 | 10/2004 |
| EP | 2987575 A1 | 2/2016 |
| GB | 1166194 A | 10/1969 |
| WO | 2017215881 A1 | 12/2017 |

* cited by examiner

*Primary Examiner* — Nirvana Deonauth
(74) *Attorney, Agent, or Firm* — Corinne R. Gorski (57) ABSTRACT

A clamping device is arranged for releasably holding a tool holder shank and includes a housing, a wedge engagement member reciprocally mounted inside the housing, and a wedge having a first pressure receiving surface and first and second wedge surfaces. An aperture extends radially through a wall of the housing and the wedge engagement member extends radially outwards into the aperture. The first wedge surface acts upon a wedge engagement slide surface on the wedge engagement member and the second wedge surface acts upon an aperture slide surface. The wedge is arranged between a surface of the housing and a surface of a member securely arranged to a drawbar to effectuate a displacement of the drawbar when the wedge is moved inwards, to clamp the tool holder shank. A sleeve is arranged around the peripheral surface of the housing for moving the wedge inwards when the sleeve is moved.

15 Claims, 3 Drawing Sheets

CLAMPING DEVICE FOR TOOL HOLDER

RELATED APPLICATION DATA

This application is a § 371 National Stage Application of PCT International Application No. PCT/EP2020/065939 filed Jun. 9, 2020 claiming priority to EP 19179442.9 filed Jun. 11, 2019.

TECHNICAL FIELD

The invention relates to clamping devices for tool holders.

BACKGROUND ART

Within the field of machine tools and metal cutting, a clamping mechanism is often used to connect a tool holder for cutting tools to the machine tool. If configured for being mounted to a rotatable spindle of the machine tool, e.g. for holding a drill or a milling tool, such clamping devices and corresponding tool holders are sometimes referred to as "driven". Machine tool spindles sometimes include integrated clamping mechanisms for clamping such driven tool holders. Many clamping mechanisms require manual operation, for example actuation of a cam shaft, for clamping and/or releasing a tool holder. There are also clamping mechanisms that are adapted for automatic tool change processes, for example where a hydraulic piston is used to control the state of the clamping mechanism.

EP1468767 discloses a machine spindle containing a clamping mechanism based on the use of two drawbars and a force-amplifier involving a number of sets of co-operating wedges arranged between the drawbars. A gas spring urges the drawbars of the clamping mechanism into a position in which a tool holder is clamped, and a hydraulic piston can be used to displace the drawbars to another position in which the clamping mechanism is in an unclamped state. However, the clamping mechanism requires a relatively large space in the axial direction of the machine spindle and the clamping mechanism is therefore not suitable for mounting driven tool holders on the periphery of a tool turret wherein the available axial space for the clamping mechanism is limited.

SUMMARY

It is an object of the present invention to mitigate the shortcomings of the prior art and to provide a clamping device for driven tool holders that is suitable for use in connection with a tool turret of a machine tool.

Thus, according to one aspect, the invention relates to a clamping device for releasably holding a tool holder shank comprising:
- a housing having a forward end, a rear end and a bore intersecting the forward end and extending rearwardly therefrom for receiving the tool holder shank in a mounting portion at the forward end of the bore;
- a drawbar being mounted reciprocally movable inside the bore, along a longitudinal axis thereof, wherein the drawbar comprises, in a forward end, engagement means which are adapted to, when caused to assume a locking position, go into engagement with an engagement formation at the end of the tool holder shank;
- a wedge engagement member securely arranged to the drawbar, wherein the wedge engagement member comprises a wedge engagement slide surface facing towards the forward end of the housing; and
- a wedge comprising a first pressure receiving surface, a first wedge surface facing towards the rear end, and a second wedge surface facing towards the forward end, wherein the first and second wedge surfaces approach each other in a radial direction towards the longitudinal axis.

An aperture extends radially through a peripheral wall of the housing, the aperture comprising an aperture slide surface facing towards the rear end of the housing, wherein the wedge extends radially inwards from the outside of the housing into the aperture, wherein the first wedge surface contacts the wedge engagement slide surface, the second wedge surface contacts the aperture slide surface, and the first pressure receiving surface faces outwards from the housing.

The clamping device further comprises a sleeve arranged on the outside of the peripheral wall of the housing around the circumference thereof and over the aperture, movable with respect to the housing in a first direction, wherein the sleeve, at its inner face, comprises a first pressure applying surface that faces inwards for contacting the pressure receiving surface, and has a radial distance to the longitudinal axis that increases in the first direction. The sleeve, the wedge, the wedge engagement member and the drawbar are such arranged that, when the sleeve is moved in the first direction, the first pressure applying surface presses the wedge radially inwards in the aperture by sliding and pressing against the first pressure receiving surface of the wedge, resulting in the first and second wedge surfaces sliding and pressing against the wedge engagement slide surface and the aperture slide surface, respectively, to force the drawbar to displace inside the bore towards the rear end, causing the engagement means to assume the locking position.

By arranging the wedge between a surface of the housing and a surface of a member securely arranged to the drawbar, and by using a sleeve around the peripheral surface of the housing for effectuating movement of the wedge, the clamping device can be designed for keeping the device in a clamped state without requiring separate means (such as a gas spring), and the device can be made very compact in the longitudinal direction. The clamping device is therefore suitable for integration within tool turrets.

A "housing" as used herein, may refer to a machine spindle, for example a spindle in a tool turret wherein the spindle is connected (or connectable) to a drive mechanism in the tool turret. However, the clamping mechanism is not limited to use in a tool turret but could be used in any spindle being part of, or being connectable to, a machine tool. For example, the housing may refer to a main spindle of a machine tool, or to a spindle that is connectable thereto. In other words, the clamping mechanism may be an integral part of a main spindle or used in a housing that is connectable to the main spindle. It is also envisaged to use the clamping mechanism in a housing that is non-rotatable, e.g. for clamping non-rotating tools. Hence, the housing does not have to be a machine spindle.

In the description and claims throughout this application the term "forward" is used to indicate a direction or position towards the outer opening of the bore through which a tool holder shank is inserted during clamping. In analogy, the terms "rear" or "rearward" are used to indicate a direction or position away from such outer opening of the bore.

Furthermore, as used herein, the expression "facing towards" a forward (or rear) end of the housing for defining the orientation of a surface, indicates that the surface is oriented such as to face the respective end at least to some degree. Thus, the expression does not only cover a configuration where the surface is perpendicular to the longitudinal axis of the housing, but also configurations wherein a normal to the surface extends at an acute angle of up to (but not including) 90° to the longitudinal axis of the housing.

Throughout this specification, any references to a radial distance, or an axial- or radial direction, are made with respect to a bore in the housing and the longitudinal axis thereof.

The wedge engagement member is securely arranged to the drawbar, for example integrally formed, fixedly arranged, or arranged such as to be immovable with respect to the drawbar at least in the longitudinal direction. Thereby, a movement of the wedge engagement member along the longitudinal axis causes a corresponding movement of the drawbar. The wedge engagement member may be arranged in a rear portion of the drawbar.

The wedge engagement member may extend radially outwards from the bore into the aperture.

The wedge engagement member, and the aperture in the peripheral wall of the housing into which the wedge engagement member extends, may be designed such that there is a play between the wedge engagement member and a rear surface of the aperture when the clamping device is in an unclamped state. This will allow the wedge engagement member to move within the aperture along the longitudinal direction towards the rear, to cause a corresponding longitudinal displacement of the drawbar within the bore. For example, the aperture may be elongated in a direction parallel to the longitudinal axis.

Since the first pressure applying surface has a radial distance to the longitudinal axis that increases in a first direction, a movement of the sleeve in the first direction results in that a pressure is applied by the first pressure applying surface on the first pressure receiving surface of the wedge. This pressure will have a component in the radial direction such that the wedge is pressed radially inwards towards the longitudinal axis.

The first and second wedge surfaces are non-parallel and approach each other in a radial direction towards the longitudinal axis. As a consequence, a radial inwards movement of the wedge results in a force on the aperture slide surface having a component towards the front in a direction parallel to the longitudinal axis. A corresponding force acts on the wedge engagement member, causing a displacement of the drawbar towards the rear in the longitudinal direction.

The wedge engagement slide surface faces towards the front end (towards the first wedge surface) and may have a corresponding extension as the first wedge surface, whereas the aperture slide surface faces towards the rear end (towards the second wedge surface) and may have a corresponding extension as the second wedge surface, such that sliding contact between the respective surfaces is achieved over a large area during movement of the wedge. However, the respective surfaces may have slightly different angles of inclination with respect to the longitudinal axis. For example, the wedge engagement slide surface may have a slightly steeper angle than the first wedge surface, to ensure that most pressure will be applied on a radially outer part of the wedge engagement member when the wedge moves inwards within the aperture. As another example, the entire wedge engagement slide surface may be curved when viewed in a longitudinal section through the bore.

At least one of the first and the second wedge surfaces, and the corresponding aperture slide surface and wedge engagement slide surface, is inclined with respect to a plane perpendicular to the longitudinal axis when viewed in a longitudinal section through the bore. If the first wedge surface and the corresponding wedge engagement slide surface is arranged in this way, a radial inwards movement of the wedge results in a force on the wedge engagement member that has both an axial component, i.e. towards the rear in a direction parallel to the longitudinal axis, and a radial component, i.e. towards the longitudinal axis. The axial component of the force will provide the displacement of the drawbar, whereas the radial component of the force may reduce the bending moment on the wedge engagement member, and make sure the wedge engagement member, if being a separate part from the drawbar and detachably arranged thereto (for example accommodated in a recess or pocket in the drawbar), is in firm engagement with the drawbar during use of the clamping device.

One, but not both, of the first and second wedge surfaces, and the corresponding aperture slide surface and wedge engagement slide surface, may be arranged in parallel with a plane perpendicular to the longitudinal axis when viewed in a longitudinal section through the bore.

According to some embodiments, though, both the first and the second wedge surface, and the corresponding aperture slide surface and wedge engagement slide surface, are inclined with respect to a plane perpendicular to the longitudinal axis when viewed in a longitudinal section through the bore.

The clamping device may comprise additional components, such as a piston, e.g. a hydraulic piston, for effectuating displacement of the sleeve. Other means for changing the position of the sleeve are also envisaged, such as, for example, means based on pneumatics. Hence, the control of the clamping device can be easily automated, without requiring any manual operations. Thus, the clamping device according to the present disclosure is suitable for use in automatic tool change applications.

The first pressure receiving surface of the wedge may have a direction of extension that corresponds to, or substantially corresponds to, the extension of the first pressure applying surface of the sleeve. In this way, the surfaces will have a large area of contact when the first pressure applying surface slides and presses against the first pressure receiving surface, such that the applied force is distributed in a good way.

The sleeve may be movable in a rotational direction with respect to the housing. That is, the first direction may correspond to a rotational direction along the periphery of the housing. Alternatively, the sleeve is movable along the periphery of the housing in an axial direction. That is, the first direction (D) may be parallel with the longitudinal axis (L). Such sleeve may be particularly suitable from a manufacturing point of view, since the sleeve may have a simple, rotationally symmetrical, design. Furthermore, if using hydraulic based control arrangements, an axial motion of the sleeve may be easier to achieve than a rotational motion. The first direction D may be towards the rear.

The first pressure applying surface and the first pressure receiving surface may have a linear, or substantially linear, extension when viewed in a longitudinal section through the bore. However, one or both surfaces, when viewed in a longitudinal section through the bore, may have a slightly curved extension. Thus, the extension of the surfaces may not correspond entirely to each other. The curvature may be small, though, such that a sufficient area of contact between the surfaces is obtained when the first pressure applying surface slides and presses against the first pressure receiving surface.

Each of the first pressure applying surface and the first pressure receiving surface, when viewed in a longitudinal section through the bore, may be inclined by a non-zero angle α with respect to a line parallel to the longitudinal axis. Hence, both the first pressure applying surface and the first pressure receiving surface may extend in the same direction, and may have a linear, or substantially linear, extension, when viewed in a longitudinal section through the bore. The angle α may be below a self-lock threshold angle, such that the sleeve attains a self-locking state with respect to the wedge when the drawbar has been displaced inside the bore towards the rear and the engagement means caused to assume the locking position. To obtain a self-locking state, the angle α should be sufficiently small, i.e. below the self-locking threshold angle. A self-locking state refers to a state in which the static friction force between the first pressure receiving surface of the wedge and the first pressure applying surface of the sleeve is greater than the opposing force in the plane of friction that is caused by a force applied to the wedge in a radial direction perpendicular to the longitudinal axis. Hence, a self-locking state is obtained within an angular range that depends on the friction coefficient between the first pressure receiving surface of the wedge and the first pressure applying surface of the sleeve. This friction coefficient may depend on various parameters, such as the materials used, coatings on the surfaces, use of lubricants, etc. Hence, the self-lock threshold angle is dependent on some or all of these parameters. A person skilled in the art will be able to identify the self-lock threshold angle that apply for a certain application by using common general knowledge and/or routine experiments, or at least predict or assess whether a certain angle is below such self-lock threshold angle. In general, it is preferred to choose an angle α that is well below the self-lock threshold angle, to assure a self-locking configuration. A further benefit of using a small angle α is that a force-amplifying effect is achieved, wherein a relatively large longitudinal displacement of the sleeve will result in a relatively small displacement of the drawbar. However, too small angle α may be inefficient and not practically well-functioning. For example, a very small angle α may result in that the clamping device get stuck in a clamped state, and the sleeve difficult to release. According to some embodiments, the angle α may be between 2° and 10°. In such range, both a self-locking configuration and an appropriate force-amplifying effect may be achieved. For example, the angle α may be between 3° and 6°, for example 4°, or approximately 4°.

The wedge may comprise a second pressure receiving surface facing outwards from the housing, and the sleeve may comprise a second pressure applying surface facing inwards for contacting the second pressure receiving surface, wherein each of these surfaces has a radial distance to the longitudinal axis that increases in the first direction. When using multiple pressure applying surfaces and corresponding pressure receiving surfaces, a clamping mechanism can be designed wherein both the required motion of the drawbar and a good force amplifying effect can be easily achieved. Each of the second pressure receiving surface and the second pressure applying surface, when viewed in a longitudinal section through the bore, may be inclined by a non-zero angle β with respect to a line parallel to the longitudinal axis, wherein the angle β is greater than the angle α, and wherein the respective first and second surfaces are arranged consecutively such that, upon a movement of the sleeve in the first direction, the second pressure applying surface slides and presses against the second pressure receiving surface before the first pressure applying surface slides and presses against the first pressure receiving surface.

Thereby, the drawbar may be quickly displaced, or transported, during the initial phase of the clamping by using the larger angle β. This initial clamping phase does not require much force. However, during the final phase of the clamping, a great force is required for displacing the drawbar a short distance. Hence, when the actual clamping occurs, i.e. when the engagement means assumes the locking position, the smaller angle α will be used such that the displacement of the drawbar will be small compared to the axial displacement of the sleeve, resulting in a force amplifying effect, also referred to as "power boost". According to some embodiments, the angle β may be between 10° and 75°. For example, the angle β may be between 35° and 65°, such as 45°, or substantially 45°, providing an efficient initial displacement of the drawbar.

The respective surfaces may be such arranged that, when the sleeve has been moved towards the rear such that the second pressure applying surface has passed the second pressure receiving surface and the first pressure applying surface reaches the first pressure receiving surface, i.e. at the transition between these respective surfaces, the drawbar has almost, but not entirely, reached its final destination at the rear end of the bore. This is because it may be beneficial if the first pressure applying surface has slid some distance onto the first pressure receiving surface before the final clamping occurs, such that there will be a sufficient area of contact between these surfaces when the pressure increases in the final phase of the clamping.

By using a steep angle for the initial displacement of the drawbar and a small angle for the actual clamping, the sleeve (and thus the clamping device) can be made relatively short in the axial direction while still providing a self-locking clamping mechanism with a significant force amplification effect.

The transitions between the first and second pressure applying surfaces, and the first and second pressure receiving surfaces, respectively, may be smooth, e.g. rounded, such that there is a sufficient area of contact between the respective pressure applying and pressure receiving surfaces also during the transition from the second surface to the first surface.

The second wedge surface and the aperture slide surface may be curved when seen from a radial direction through the aperture. Thereby, the wedge is, to some small extent, displaceable around an axis coinciding with the radial direction. As a consequence, the wedge will be able to automatically compensate for geometrical deviations or defects of one or more of the components, by adapting its position within the aperture with respect to the aperture slide surface.

The wedge engagement member may be detachably arranged to the drawbar. For example, the wedge engagement member can be a separate part that is accommodated in a recess or pocket in the drawbar. Such recess or pocket may be designed such that the wedge engagement member will be firmly engaged with the drawbar, immovable with respect thereto, at least in a longitudinal direction. If the wedge engagement member would be integrally formed with the drawbar, it might be difficult to arrange the drawbar within the bore if the wedge engagement member is arranged such as to extend radially into the aperture in the peripheral wall of the housing. A separate detachable wedge engagement member, on the other hand, can be inserted through the aperture from the outside of the housing, thus simplifying mounting of the clamping mechanism within the housing.

The sleeve may comprise a forwardly facing release pressure applying surface arranged to contact and apply pressure on a rearwardly facing release pressure receiving surface on the wedge engagement member when the sleeve is moved in a direction opposite to the first direction, resulting in a displacement of the drawbar inside the bore towards the front end. Thereby, the clamping can be released simply by moving the sleeve in the opposite direction. Release of the clamping device does not require as much force as clamping. Nonetheless, some force may be required to overcome any self-locking effect between the tool holder shank and the mounting portion, to push the tool holder shank out from the mounting portion, and this force may be provided by the release pressure applying surface acting directly upon the release pressure receiving surface of the wedge engagement member. Accordingly, the clamping may be released without involvement of the wedge.

In addition to, or as an alternative to, the release pressure applying surface on the sleeve, the clamping device may further comprise a release spring for urging the drawbar towards the front. Such release spring may be arranged to displace the drawbar towards the front when the sleeve is moved in a direction opposite to the first direction. Such spring may ensure that the drawbar and wedge engagement member is pushed towards the front immediately when the sleeve is moved in the direction opposite the first direction. Thereby, the first and second wedge surfaces will keep in contact with, and slide against, the wedge engagement slide surface and the aperture slide surface, respectively, when releasing the clamping. According to some embodiments, the spring will ensure that the parts of the clamping device are kept in close contact with each other during the initial phase of the release, such that no parts are erroneously dislocated. Thereafter, a release pressure applying surface may provide a force upon the wedge engagement member that is sufficient to push the tool holder shank out from the mounting portion. The release spring may be a compression coil spring arranged along the longitudinal axis, behind the drawbar, to urge the drawbar towards the front.

The clamping device may comprise a plurality of wedges and wedge engagement members arranged to extend through a corresponding number of different apertures in the peripheral wall of the housing. The apertures and the related wedges and wedge engagement members may be rotational symmetrically spaced around the circumference of the housing. Thereby, a well-balanced, rotationally symmetrical, clamping device is obtained, with good force distribution and wherein any undesirable bending moments or other unwanted effects are avoided. A very high number of wedges and corresponding apertures may be undesirable, though, since this may lead to reduced robustness of the housing. According to some embodiments, the clamping device comprises three wedges and wedge engagement members. Accordingly, these wedges may be spaced from each other around the circumference of the housing by 120°. Thereby, a relatively simple, yet well-balanced, clamping device is obtained, providing a sufficient level of force distribution but with maintained robustness since requiring only a small number of apertures in the housing.

The mounting portion at the forward end of the bore may be conical, and may also have a non-circular cross section. The conical shape ensures a connection free from play in the radial as well as the axial direction, whereas the non-circular cross-section (e.g. with a "triangular" or polygonal shape) ensures an nonrotatable fixation of the mounting shank in relation to the mounting bore.

It is apparent that the invention can be varied and modified in many different ways within the scope of the claims. For example, in the hereinafter described and illustrated exemplary embodiment of the invention, the mounting bore of the clamping device is conically formed and has a somewhat "triangular" or polygonal shape in cross section for clamping a tool holder having a similarly shaped mounting shank. However, the mounting bore could also have a different shape for clamping other types of mounting shanks.

BRIEF DESCRIPTION OF DRAWINGS

In the following, example embodiments will be described in greater detail and with reference to the accompanying drawings, in which.

All the figures are schematic, not necessarily to scale, and generally only show parts which are necessary in order to elucidate the respective embodiments, whereas other parts may be omitted or merely suggested. Unless otherwise indicated, like reference numerals refer to like parts in different figures.

DETAILED DESCRIPTION OF EMBODIMENTS

Figure 1:
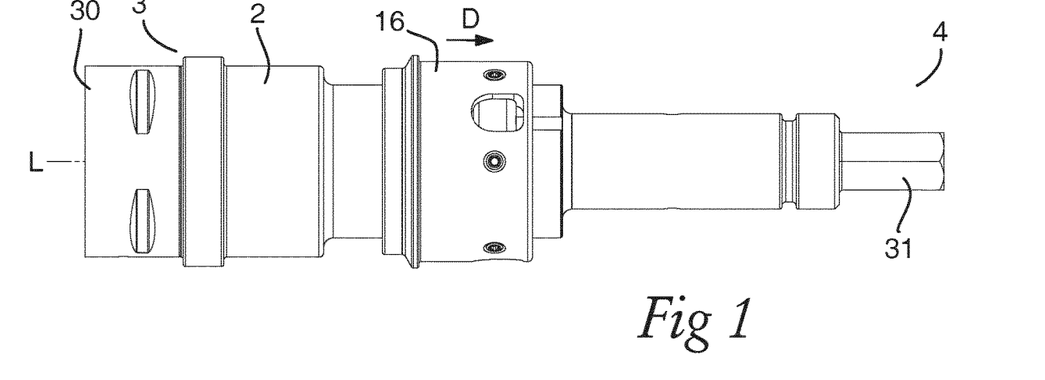
FIG. 1 is a side view of a clamping device in a clamped state, holding a tool holder.

FIG. 1 is a side view of a clamping device 1, in which a tool holder 30 (very schematically shown in FIGS. 1 and 3-7) is clamped. A housing 2, in this case a machine spindle, extends between a forward end 3, at which the tool holder 30 is mounted, and a rear end 4. The machine spindle 2 is connectable to a drive mechanism in a tool turret of a machine tool via a connection pin 31. A sleeve 16 is arranged around the circumference of the spindle 2 and movable in the axial direction, i.e. along the longitudinal axis, along a first direction D towards the rear end 4 and in a direction opposite the first direction D towards the forward end 3.

Figure 2:
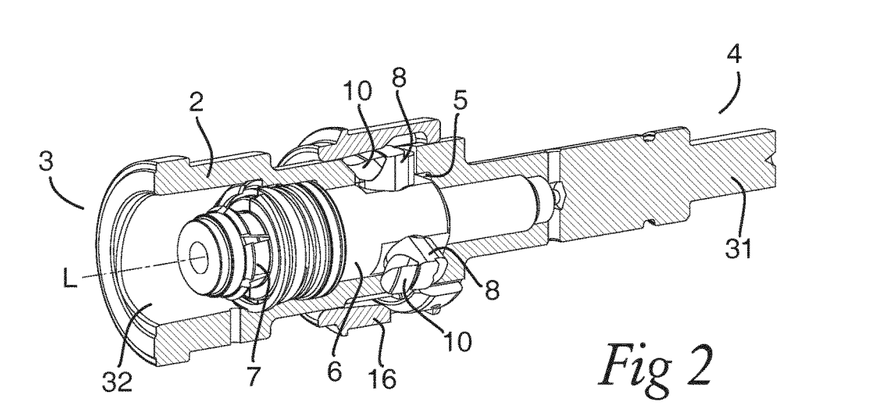
FIG. 2 is an isometric view of the clamping device in a clamped state, wherein the sleeve and the housing are shown in a section along the longitudinal axis.

FIG. 2 is an isometric view of the clamping device wherein parts of the sleeve 16 and the spindle 2 have been removed such that a drawbar 6, wedges 10 and wedge engagement members 8 are shown. The drawbar 6 is mounted reciprocally movable inside a bore 5, along a longitudinal axis L. The forward end of the bore 5 comprises a mounting portion 32 for receiving a shank 33 of a tool holder 30 (not shown in FIG. 2). Engagement means 7 in the form of engagement segments are arranged near the forward end of the drawbar 6.

Figure 3:
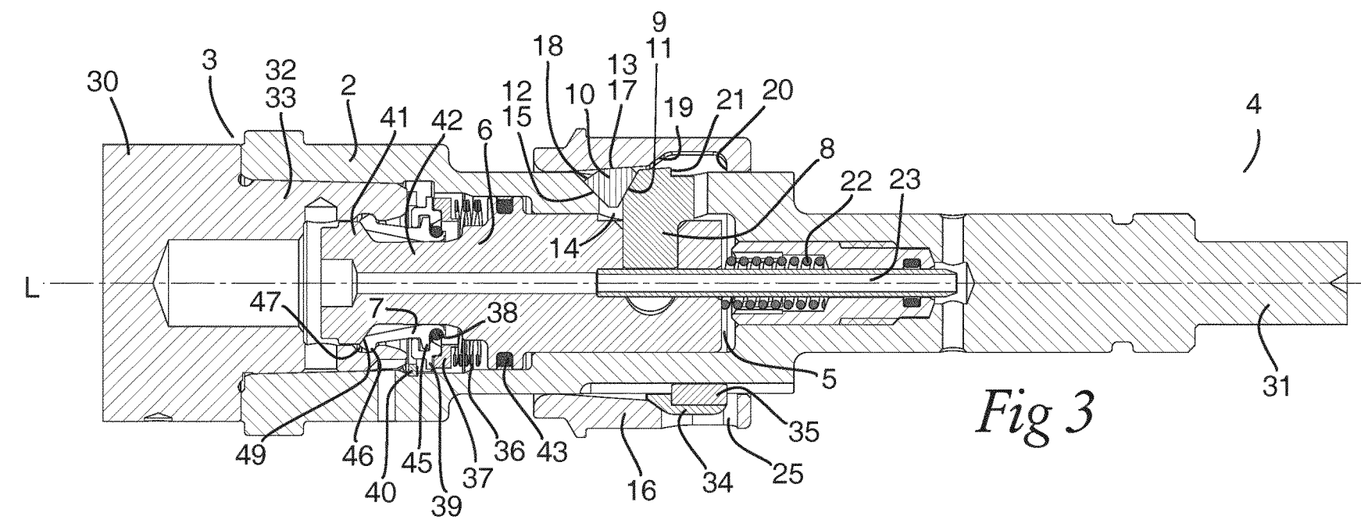
FIG. 3 shows the clamping device and tool holder in a clamped state in a cross-section through the clamping device along the longitudinal axis.

FIG. 3 shows a cross-section of the clamping device 1 as shown in FIG. 1, along the longitudinal axis L. The tool holder 30 is provided with a mounting shank 33, which in the illustrated embodiment is of a kind disclosed in U.S. Pat.

No. 5,340,248, comprising a conical shank having an axial bore and a somewhat "triangular" or polygonal, non-circular cross section, which is adapted to be drawn into a correspondingly shaped mounting portion 32. A sealing ring 43 is arranged between the drawbar 6 and the inner surface of the housing 2. According to this embodiment, a coupling mechanism of the clamping device comprises not only the engagement segments 7, but also a compression spring 36, a thrust ring 37, a retainer ring 39, an elastic O-ring 38, and a stop ring 40, all arranged within the bore 5. The coupling mechanism, which will be described later, is similar to other coupling mechanisms used previously for clamping devices, for example as disclosed in EP2987575.

The clamping device comprises three wedges 10, and three corresponding wedge engagement members 8 (wherein one set of a wedge and a wedge engagement member can be seen in FIG. 3). The wedge 10 and the wedge engagement member 8 extends at least partly through an aperture 14 in the peripheral wall of the spindle 2, wherein the aperture 14 is elongated in the longitudinal direction and comprises a wedge slide surface 15 facing towards the rear and inclined by approximately 45° with respect to a line parallel to the longitudinal axis.

The wedge engagement member 8 is firmly held within a pocket in the drawbar 6 that extends radially all the way to an internal channel 23 for conveying coolant through the clamping device 1. The wedge engagement member 8 is thereby immovably arranged with respect to the drawbar 6. The wedge engagement member 8 comprises a wedge engagement slide surface 9 facing towards the front and inclined by approximately 60° with respect to a line parallel to the longitudinal axis L. The wedge engagement member 8 further comprises a release pressure receiving surface 21 facing towards the rear.

The wedge 10 comprises a first wedge surface 11 facing towards the rear and having a corresponding inclination with respect to a line parallel to the longitudinal axis as the wedge engagement slide surface 9 and arranged to contact the same. The wedge 10 further comprises a second wedge surface 12 facing towards the front and having a corresponding inclination with respect to a line parallel to the longitudinal axis as the aperture slide surface 15 and arranged to contact the same. The wedge also comprises a first pressure receiving surface 13 and a second pressure receiving surface 18, both facing outwards from the spindle, wherein the first pressure receiving surface 13 is inclined by approximately 4° with respect to a line parallel to the longitudinal axis and the second pressure receiving surface 18 is inclined by approximately 35° with respect to a line parallel to the longitudinal axis.

The sleeve 16 comprises, at its inner face, a first pressure applying surface 17 and a second pressure applying surface 19, both facing inwards for contacting the first pressure receiving surface 13 and the second pressure receiving surface 18, respectively, on the wedge. The sleeve 16 also comprises a release pressure applying surface 20 facing towards the front. Furthermore, the clamping device comprises supporting segments 34 and pins 35 (best seen in FIG. 8). The supporting segments 34 supports the wedges 10 such that they are kept in place and cannot be dislocated with respect to the sleeve 16 in the circumferential direction. Each pin 35 is arranged to be accommodated partly in a recess in the spindle 2, and partly in a recess in a supporting segment 34. The pins 35 secure the sleeve 16 with respect to the spindle 2 in the circumferential direction, for preventing any mutual rotational movement between the sleeve 16 and the spindle 2. Consequently, if the spindle is rotated, the sleeve 16 will rotate together with the spindle 2 with a corresponding rotational speed and cannot be displaced with respect to the spindle 2 in the circumferential direction.

The clamping device 1 also comprises a release spring 22 arranged at the rear portion of the drawbar 6.

Figure 4:
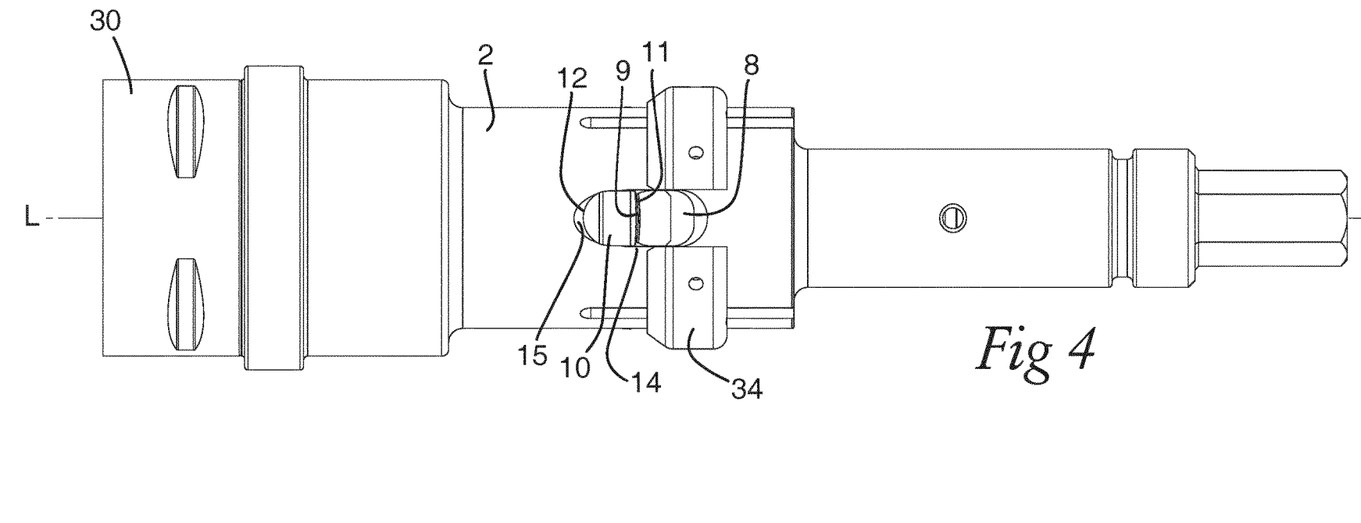
FIG. 4 is a top view of the clamping device and tool holder in a clamped state, with the sleeve removed.
Figure 5:
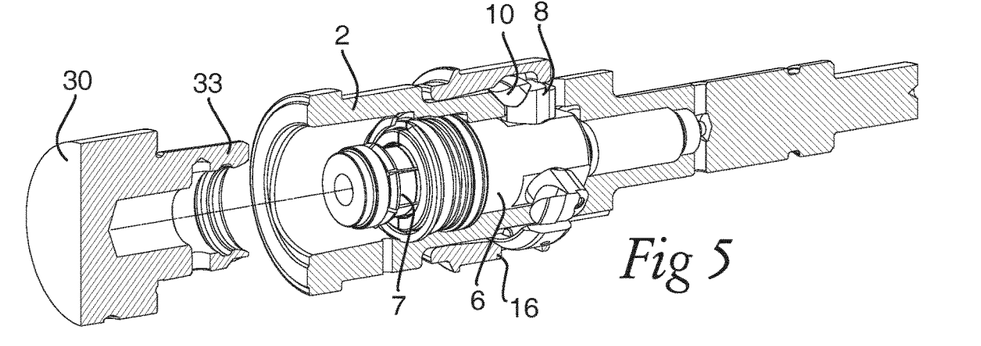
FIG. 5 is an isometric view of the clamping device in an unclamped state, wherein the sleeve, the housing and the tool holder are shown in a section along the longitudinal axis.

FIG. 4 is a top view of the clamping device 1 in FIGS. 1-3, as viewed in a radial direction through one of the apertures 14 in the spindle 2, and with the sleeve 16 removed such that the wedge 10 and the wedge engagement member 8 are shown. In this view, the second wedge surface 12 and the corresponding aperture slide surface 15 are curved, whereas the first wedge surface 11 and the corresponding wedge engagement slide surface 9 are substantially flat.

In FIGS. 1-4, the clamping device 1 is shown in a locked, or clamped, state, wherein the sleeve 16 has been moved towards the rear such that the engagement means 7 has been caused to assume the locking position. In this position, the drawbar 6, and in effect also the sleeve 16, cannot be moved any further towards the rear.

FIGS. 5-8 show the clamping device 1 in an unlocked position, wherein the sleeve 16 has been moved towards the front such that the engagement means 7 has been caused to leave the locking position, and the shank 33 of the tool holder 30 has been "pushed out" from the mounting portion 32.

Figure 6:
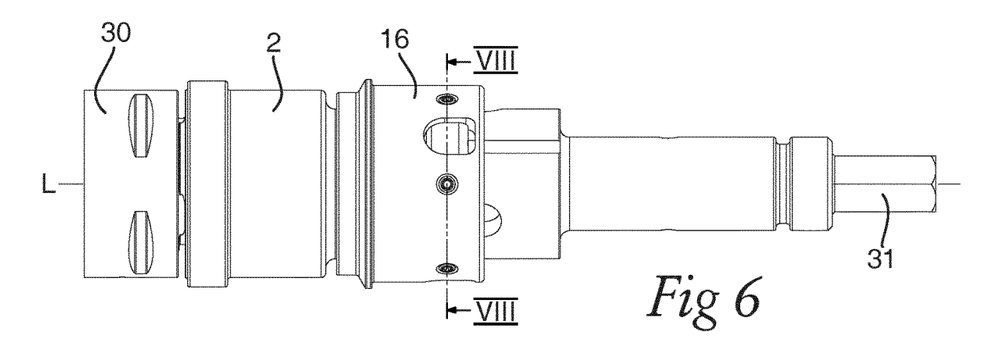
FIG. 6 is a side view of the clamping device and tool holder in an unclamped state.
Figure 7:
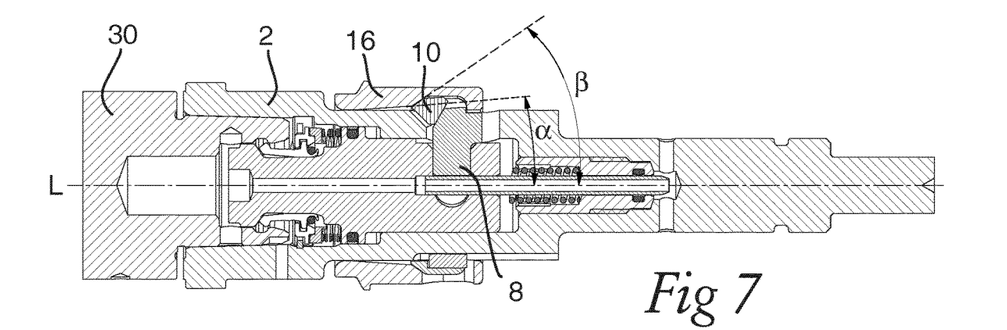
FIG. 7 shows the clamping device and tool holder in an unclamped state in a cross-section through the clamping device along the longitudinal axis.
Figure 8:
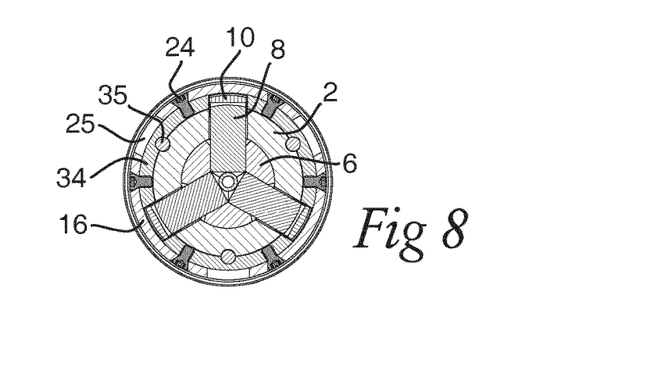
FIG. 8 shows the clamping device in a cross-section as indicated in FIG. 6.

FIG. 8 shows a cross-section, transversal to the longitudinal axis, in a plane as indicated in FIG. 6. The wedges 10 and wedge engagement members 8 are symmetrically spaced around the circumference of the drawbar 6. Screws 24 connect the sleeve 16 with the supporting segments 34, such as to prevent any mutual motion between the sleeve 16 and the supporting segments 34. The sleeve further comprises three assembling holes 25. When assembling the clamping device 1, the drawbar 6 is inserted into the spindle from the front, and the sleeve and the supporting segments 34 together with the pins 35, are slid on to the spindle from the rear side. The sleeve 16 is rotated with respect to the spindle 2 and the supporting segments 34 and the pins 35 (which is possible since the outer part of the sleeve has not yet been fixed to the supporting segments) such that the assembling holes 25 are aligned with the apertures 14. Then, the wedge engagement members 8 and the wedges 10 are inserted. Thereafter, the sleeve 16 is rotated until screw holes therein are aligned with corresponding screw holes in the supporting segments 34. Finally, the screws 24 are used to fix the sleeve 16 to the supporting segments 34. In this state, the sleeve is not movable in the circumferential direction but only in the axial direction. Moreover, in the assembled state, the sleeve cannot be removed in the axial direction from the spindle 2 because of the wedges and the wedge engagement members.

In the following, the function of the clamping device 1 will be described.

The clamping device 1 in FIG. 5-8 is in an initial state in which the tool holder 30 is unlocked from the clamping device 1. As can be seen, the engagement segments 7 are mounted around a neck portion 42 of the drawbar 6 in a space formed between the neck portion and an inner surface of an engagement bore within the mounting shank 33 of the tool holder 30. The engagement segments 7 are held in place by means of an outward extending flange portion 45 of each engagement segment being in engagement with an inner groove inside the retainer ring 39, and the elastic o-ring 38 is positioned in an outward facing groove formation in the rear end of the engagement segments. The forward ends of the engagement segments are formed with outward directed engagement flanges 46, which are adapted to go into engagement with an inner engagement groove 47 inside the engagement bore of the tool holder but are in this initial state out of engagement with the engagement groove (see FIG. 7). Moreover, the compression spring 36 is mounted between a flange of the drawbar and the thrust ring 37 and forces it as well as the retainer ring 39 and the engagement segments 7 in the forward direction against the stop ring 40. To reach this unlocked state, the sleeve 16 has been moved towards the front end. When the sleeve 16 is moved in the forward direction, the force exerted by the release spring 22 will displace also the drawbar 6 in the forward direction, and when the sleeve 16 has been moved as far as possible towards the front, the release pressure applying surface 20 on the sleeve presses against the release pressure receiving surface 21 on the wedge engagement member 8, providing the force required for causing the engagement segments 7 to leave the locked position and push the tool holder shank 33 out from the mounting portion 32.

Reference is now made to FIGS. 1-4. Here the clamping device is in a locked or clamped state in which the mounting shank 33 is coupled to the clamping device 1 by means of the coupling mechanism and drawn by means of the drawbar 6 with a large force into firm engagement within the mounting portion 32 of the spindle 2.

This is accomplished by moving the sleeve 16 in the first direction D, i.e. towards the rear, such that the drawbar 6 is displaced in a rearward direction, which is described in more detail further below. As can be seen from FIG. 3, the thrust ring 37, the retainer ring 39 and the engagement segments 7 are still pushed forward toward the stop ring 40 by means of the compression spring 36, while the drawbar 6 is drawn rearward by means of the wedge engagement member 8. This has to effect that the engagement segments 7 will be displaced outwards in relation to the drawhead 41 such that their forward ends will slide on a rearward facing beveled surface 49 of the drawhead 41. In this way, the engagement flanges 46 on the forward ends of the engagement segments 7 will be displaced outwards into a locking position and go into engagement with the engagement groove 47 inside the engagement bore of the tool holder such that the tool holder shank 33 will be drawn by means of the drawbar 6 into firm bearing against the surfaces of the mounting portion 32 in the spindle 2.

When the sleeve 16 is moved towards the rear from a starting position corresponding to the unlocked state as shown in FIGS. 5-8, the second pressure applying surface 19 on the sleeve 16 will slide and press against the second pressure receiving surface 18 on the wedge 10. Thereby, the wedge 10 will be pressed inwards through the aperture 14 and the drawbar 6 will be displaced towards the rear. Due to the relatively steep inclination β (indicated in FIG. 7) of the second pressure applying- and receiving surfaces 19, 18, the wedge 10 will initially move inwards quite fast, resulting in a relatively quick displacement of the drawbar 6. The relatively steep angle β is advantageous to use since the initial displacement of the drawbar 6 does not require much force.

The first and second pressure applying- and receiving surfaces 13, 17, 18, 19 are so arranged such that when the sleeve 16 has been moved towards the rear such that the second pressure applying surface 19 has passed the second pressure receiving surface 18 and the first pressure applying surface 17 reaches the first pressure receiving surface 13, i.e. at the transition between these respective surfaces, the drawbar 6 has almost reached its final destination at the rear end of the bore 5. Hence, for the final clamping phase, in which a large force is beneficial, the first pressure applying- and receiving surfaces 13, 17 are active. In this phase, a relatively large movement of the sleeve 16 will result in a very small radial displacement of the wedge 10, and an even smaller axial displacement of the drawbar 6, thus providing a force amplification effect. Furthermore, the small inclination α (indicated in FIG. 7) of the first pressure applying- and receiving surfaces 13, 17 will provide a self-locking effect wherein the clamping device will remain in the clamped state without requiring any additional means.

The invention claimed is:

1. A clamping device for releasably holding a tool holder shank, the clamping device comprising:
   a housing having a forward end, a rear end and a bore intersecting the forward end and extending rearwardly therefrom for receiving the tool holder shank in a mounting portion at a forward end of the bore;
   a drawbar mounted reciprocally movable inside the bore, along a longitudinal axis thereof, wherein the drawbar includes, in a forward end of the drawbar, engagement means engaging with an engagement formation at the end of the tool holder shank when in a locking position;
   a wedge engagement member arranged on the drawbar, wherein the wedge engagement member includes a wedge engagement slide surface facing towards the forward end of the housing; and
   a wedge including a first pressure receiving surface, a first wedge surface facing towards the rear end, and a second wedge surface facing towards the forward end of the housing, wherein the first and second wedge surfaces extends toward each other in a radial direction towards the longitudinal axis;
   an aperture extending radially through a peripheral wall of the housing, the aperture having an aperture slide surface facing towards the rear end of the housing, wherein the wedge extends radially inwards from an outside of the peripheral wall of the housing into the aperture, and wherein the first wedge surface contacts the wedge engagement slide surface, the second wedge surface contacts the aperture slide surface, and the first pressure receiving surface faces outwards from the housing; and
   a sleeve arranged on the outside of the peripheral wall of the housing around the circumference thereof and over the aperture, movable with respect to the housing in a first direction, wherein the sleeve, at an inner face, includes a first pressure applying surface that faces inwards for contacting the first pressure receiving surface, and has a radial distance to the longitudinal axis that increases in the first direction, wherein the sleeve, the wedge, the wedge engagement member and the drawbar are such arranged that, when the sleeve is moved in the first direction, the first pressure applying surface presses the wedge radially inwards in the aperture by sliding and pressing against the first pressure receiving surface of the wedge, resulting in the first and second wedge surfaces sliding and pressing against the wedge engagement slide surface and the aperture slide surface, respectively, to force the drawbar to displace inside the bore towards the rear end, positioning the engagement means to in the locking position.

2. The clamping device according to claim 1, wherein the first direction is parallel with the longitudinal axis.

3. The clamping device according to claim 2, wherein each of the first pressure applying surface and the first pressure receiving surface, when viewed in a longitudinal section through the bore, is inclined by a non-zero angle α with respect to a line parallel to the longitudinal axis.

4. The clamping device according to claim 3, wherein the non-zero angle α is below a self-lock threshold angle, such that the sleeve attains a self-locking state with respect to the wedge when the drawbar has been displaced inside the bore towards a rear end of the bore and the engagement means positioned in the locking position.

5. The clamping device according to claim 3, wherein the wedge includes a second pressure receiving surface facing outwards from the housing and the sleeve comprises a second pressure applying surface facing inwards for contacting the second pressure receiving surface, each of the second pressure receiving surface and the second pressure applying surface having a radial distance to the longitudinal axis that increases in the first direction.

6. The clamping device according to claim 5, wherein each of the second pressure receiving surface and the second pressure applying surface, when viewed in a longitudinal section through the bore, is inclined by a non-zero angle β with respect to a line parallel to the longitudinal axis, wherein the non-zero angle β is greater than the non-zero angle α, and wherein respective first and second pressure applying and receiving surfaces of the first and the second pressure applying and receiving surfaces are arranged consecutively such that, upon a movement of the sleeve in the first direction, the second pressure applying surface slides and presses against the second pressure receiving surface before the first pressure applying surface slides and presses against the first pressure receiving surface.

7. The clamping device according to claim 1, wherein the second wedge surface and the aperture slide surface are curved when seen from a radial direction through the aperture.

8. The clamping device according to claim 1, wherein the wedge engagement member is detachably arranged with the drawbar.

9. The clamping device according to claim 1, wherein the sleeve includes a forwardly facing release pressure applying surface arranged to contact and apply pressure on a rearwardly facing release pressure receiving surface on the wedge engagement member when the sleeve is moved in a direction opposite to the first direction, resulting in a displacement of the drawbar inside the bore towards the forward end of the bore.

10. The clamping device according to claim 1, further comprising a release spring for urging the drawbar towards the forward end of the bore.

11. The clamping device according to claim 1, wherein the clamping device includes a plurality of respective wedges and respective wedge engagement members arranged to extend through a corresponding number of respective apertures in the peripheral wall of the housing, wherein the respective apertures and the respective wedges and the respective wedge engagement members are rotational symmetrically spaced around the circumference of the housing.

12. The clamping device according to claim 11, wherein the clamping device includes the plurality of respective wedges and the respective wedge engagement members including three wedges and three wedge engagement members.

13. The clamping device according to claim 1, wherein the mounting portion at the forward end of the bore is conical.

14. The clamping device according to claim 1, wherein the mounting portion at the forward end of the bore has a non-circular cross section.

15. The clamping device according to claim 1, wherein the housing is a machine spindle.

\* \* \* \* \*